United States Patent [19]

Fukasawa

[11] Patent Number: 5,126,963
[45] Date of Patent: Jun. 30, 1992

[54] HARDWARE ARRANGEMENT FOR FLOATING-POINT MULTIPLICATION AND OPERATING METHOD THEREFOR

[75] Inventor: Hisako Fukasawa, Yamanashi, Japan

[73] Assignee: NEC Corporation, Tokyo, Japan

[21] Appl. No.: 526,141

[22] Filed: May 22, 1990

[30] Foreign Application Priority Data

May 22, 1989 [JP] Japan .................................. 1-126688

[51] Int. Cl.⁵ ............................................... G06F 7/52
[52] U.S. Cl. ................................. 364/748; 364/715.04
[58] Field of Search ........................... 364/748, 715.04

[56] References Cited

U.S. PATENT DOCUMENTS

| | | | |
|---|---|---|---|
| 4,779,220 | 10/1988 | Nukiyama | 364/748 |
| 4,922,446 | 5/1990 | Zurawski et al. | 364/748 |
| 4,941,120 | 7/1990 | Brown et al. | 364/748 |
| 5,010,508 | 4/1991 | Sit et al. | 364/748 |

Primary Examiner—David H. Malzahn
Attorney, Agent, or Firm—Foley & Lardner

[57] ABSTRACT

The amount of shifting required for normalizing a result of floating-point type multiplication is screened to determine if it falls within a predetermined range. The result is directly normalized in the event that the amount of shifting falls within the range while if the amount falls outside the predetermined range, the result is subject to coarse shifting until it falls in the predetermined range and then is normalized.

4 Claims, 5 Drawing Sheets

SF : SIGN BIT OF FRACTION
 (0: POSITIVE, 1: NEGATIVE)

SE : SIGN BIT OF EXPONENT
 (0: POSITIVE, 1: NEGATIVE)

E : EXPONENT

F : FRACTION

X = -64·SE + E

S : SIGN BIT OF FRACTION
 (0: POSITIVE, 1: NEGATIVE)

E : EXPONENT

F : FRACTION

X = -64 + E

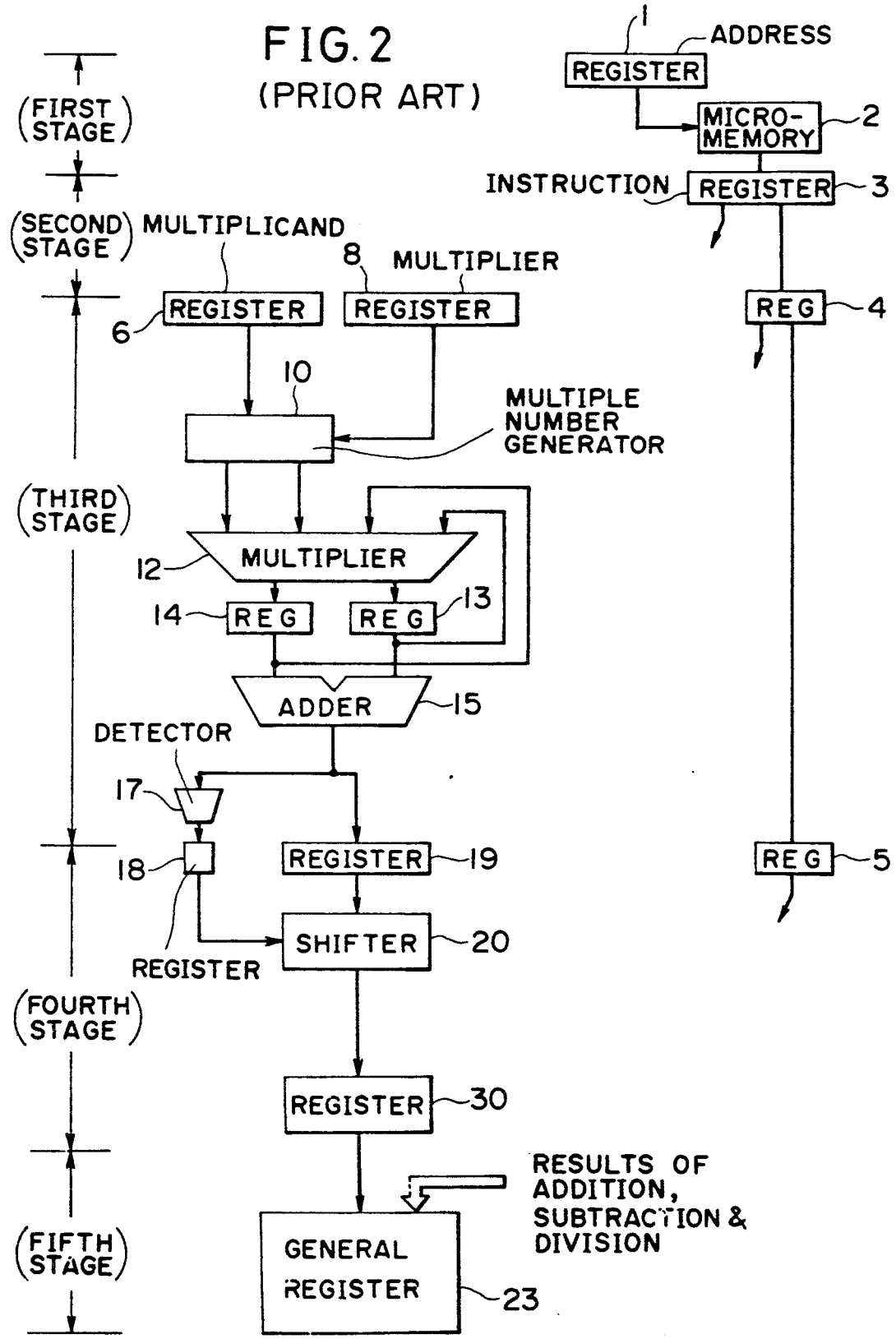

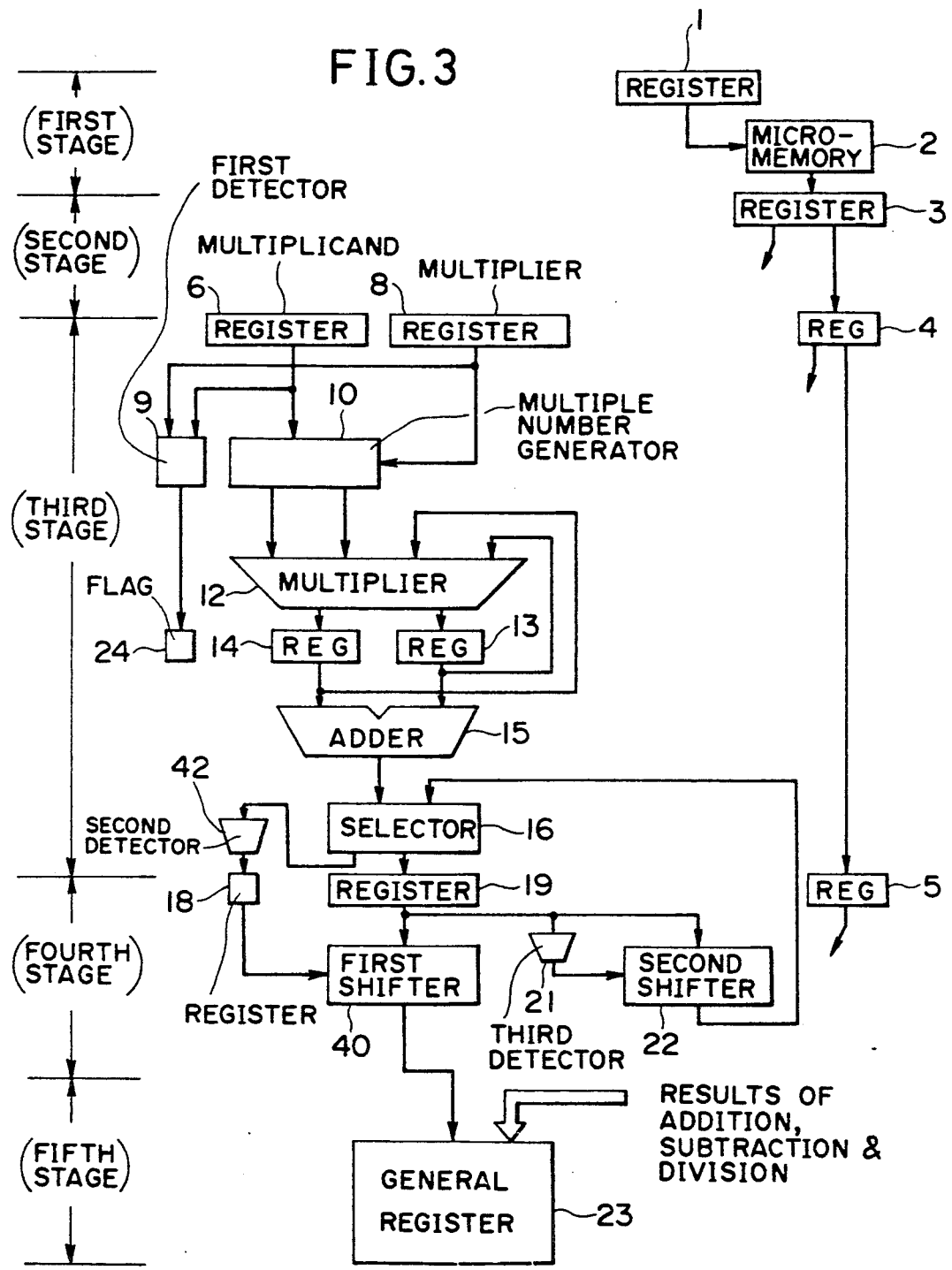

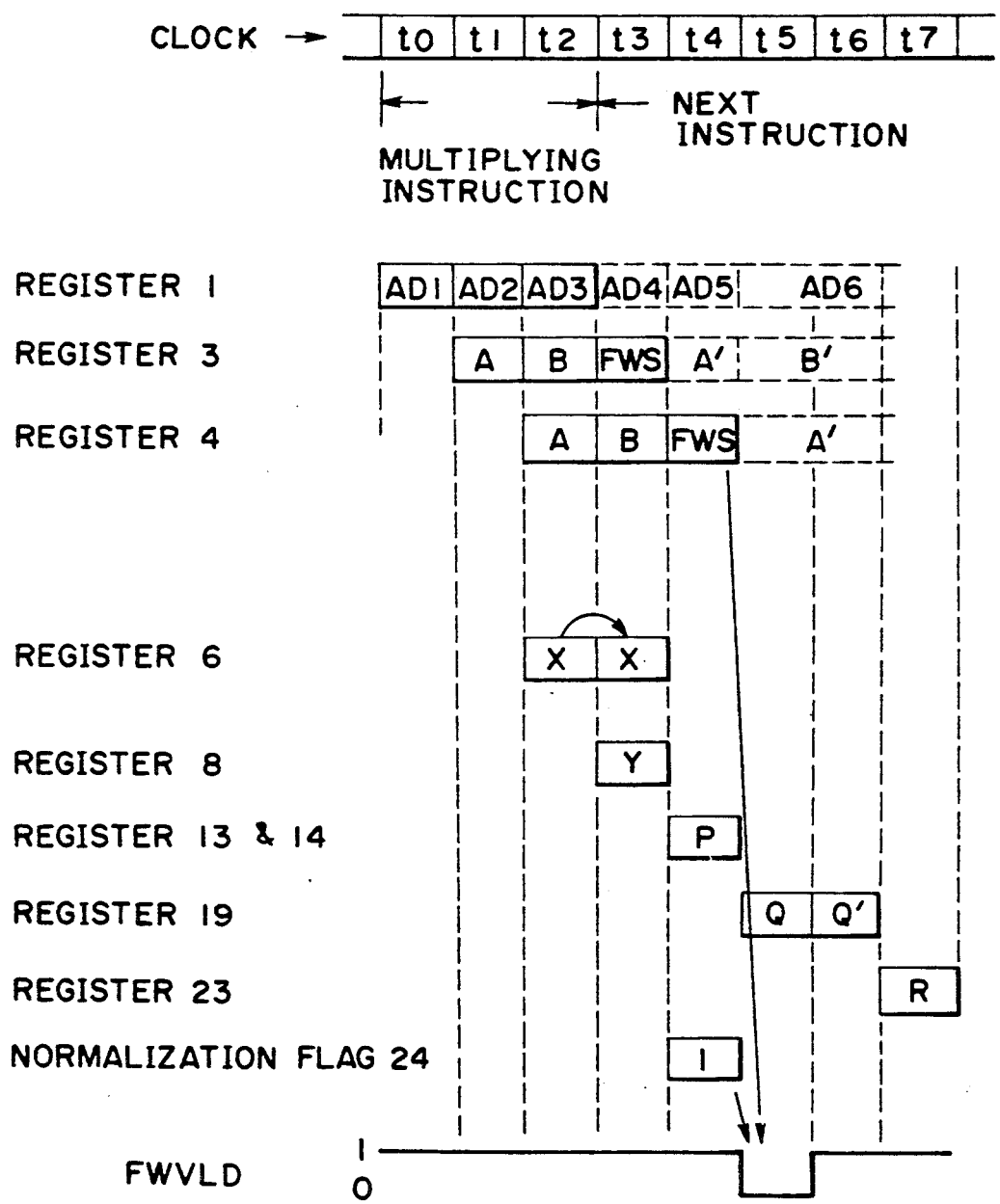

HARDWARE ARRANGEMENT FOR FLOATING-POINT MULTIPLICATION AND OPERATING METHOD THEREFOR

BACKGROUND OF THE INVENTION

1. Field of the Invention

The present invention relates generally to a hardware arrangement for performing floating-point multiplication and a method of operating the same. More specifically, the present invention relates to a hardware arrangement and operation method which enables an effective reduction of execution time of floating-point multiplication with a only a small increase in relatively simple hardware.

2. Description of the Prior Art

Programs considered "typical" by the user of high performance computers are floating-point oriented. However, the time required for execution of floating-point instructions is quite long compared with the time required for the issuance of the execution instructions by an instruction unit. There is therefore a demand to reduce the execution time for floating-point calculations without an undesirable increase in complicated hardware.

Before describing the present invention, a known technique for executing floating-point multiplication will be discussed with reference to FIGS. 1A, 1B and 2.

FIGS. 1A and 1B illustrate two kinds of floating-point data formats.

The format of FIG. 1A starts with a sign bit (SF) denoting fraction, 0 being positive and 1 being negative. The second bit is a sign bit denoting exponent, 0 being positive and 1 being negative. The subsequent six bit positions are occupied by exponent E. Fraction F consists of six hexadecimal digits (24 bits) in this case. The radix point of the fraction F is assumed to be immediately to the left of the high-order fraction digit. To provide the proper magnitude for the floating-point number, the fraction is considered to be raised by a power to the base 16. The exponent is treated as an excess 64 number with a range from $-64$ through $+63$ corresponding to the binary expression of the values 0-127. Therefore, X is expressed by $(-64. \text{Se}+E)$. A negative quantity of the fraction is indicated by 2's compliment in the FIG. 1A format.

Similarly, in FIG. 1B, the first bit is the sign bit for the number as a whole and assumes 0 or 1 for indicating the number positive or negative. The subsequent seven bit positions are occupied by exponent E. Fraction F is indicated by a true number. To provide the proper magnitude for the floating-point number, the fraction is raised by a power to the base 16.

If two normalized floating-point numbers are multiplied having the format shown in FIGS. 1A or 1B, the result can be normalized by one bit shifting to left or right.

In more detail, if each of two normalized floating-point numbers has the format shown in FIG. 1A, the result of the multiplication is normalized by one digit shifting to the right as follows. That is to say, if (SF) (fraction in 2's compliments)
1 .0000 0000 0000 0000 0000 0000 is multiplied by (SF) (fraction in 2's compliments)
1 .0000 0000 0000 0000 0000 0000, then the result is 1.0000 0000 0000 0000 0000 0000

It should be noted that the leading bit "1" in the fraction of the result does not have to be stored and is assumed to be present. The result can be normalized by one digit shifting to right as follows:

(SF) (fraction)
0 .0001 0000 0000 0000 0000 0000

Further, if two normalized data are multiplied, the minimum value of the result takes place as shown in the following cases (a) to (c);

case (a):

(SF or S) (fraction)
0 .0001 0000 0000 0000 0000 0000 is multiplied by (SF or S) (fraction)
0 .0001 0000 0000 0000 0000 0000 in both of the formats shown in FIGS. 1A and 1B case (b);

(SF) (fraction in 2's compliment)
0 .0001 0000 0000 0000 0000 0000 is multiplied by (SF) (fraction in 2's compliment)
1 .1110 1111 1111 1111 1111 1111 in the format shown in FIG. 1A; and case (c);

(SF) (fraction in 2's compliment)
1 .1110 1111 1111 1111 1111 1111 is multiplied by (SF) (fraction in 2's compliment)
1 .1110 1111 1111 1111 1111 1111 in the format shown in FIG. 1A.

The result obtained in the above-mentioned case (a) is

0 .0000 0001 0000 0000 0000 0000 and is normalized by one digit shifting to the left as follows:

0 .0001 0000 0000 0000 0000 0000

Similarly, the result of each of the cases (b) and (c) is normalized by one digit shifting to the left although not shown for brevity.

In summary, in the event that two normalized operands are multiplied, a single digit shifting to the left or the right is sufficient for normalizing the result. However, in order to comply with the multiplication of unnormalized operands, although it rarely occurs, a shifter which can perform a large amount of shifting is required for normalizing the result. In other words, according to the above mentioned known technique, a shifter having the capacity to perform a large amount of shifting is essential and must be provided. Consequently, the conventional technique has encountered drawbacks in that execution time is wasted by shifting when it occurs and in that the configuration of the shifter itself is highly complicated.

The above-mentioned prior art will further be discussed with reference to FIG. 2.

FIG. 2 is a block diagram of data flows for the execution of floating-point multiplication. The execution is performed under the control of a microprogram and is functionally grouped into five stages. In the first stage, microinstructions, which are stored in the micromemory 2, are read out into to an instruction register 3. In the second stage, a multiplier and a multiplicand are derived from a suitable memory (not shown). These input operands are stored in the registers 6, 8 and then multiplied in the third stage. Following this the product is normalized in the fourth stage. The normalized result is then written into a general register 23 in the fifth and final stage.

Further description will be given in connection with the block diagram shown in FIG. 2. In the illustrated arrangement micro-instructions are sequentially derived from the micromemory 2 in response to instruction addresses applied thereto from an instruction address register 1. The microinstructions thus read out, are stored in the instruction register 3. Microinstruction registers 4, 5 are assigned to the third and fourth execution stages, respectively.

The multiplier and the multiplicand are respectively stored in registers 6, 8 in the third stage. It is assumed, in this particular embodiment, that each of the input operands has the format shown in FIG. 1B. Therefore, if the two operands are normalized before being applied to the registers 6 and 8, one digit shifting to the left is sufficient for normalization and, in the event of the occurrence of a carry, no shifting is required for normalization. On the other hand, in the event that at least one of the two input operands is unnormalized, more than two digit shifting of the product to the left is necassary for normalization. The input operands stored in the registers 6 and 8, are applied to a multiple number generator 10. A multiplier 12 receives the outputs of the multiple number generator 10 and applies partial results to registers 13 and 14. These in turn apply the partial results stored therein to an adder 15 and also back to the multiplier 12.

The adder 15 applies the output thereof to a shifter 20 via a register 17 and also to a detector 17 wherein the amount of shifting for normalization is determined. The amount of shifting, detected by the detector 17, is stored in a register 18. The shifter 20 normalizes the result applied thereto from the adder 15 by shifting it to the left according to the value stored in the register 18.

Since each fraction of the input operands consists of four hexadecimal digits in this particular embodiment, the amount of shifting to the left for normalization ranges from one to a maximum of ten digits. This means the shifter 20 must be configured to meet a wide range of shifting requirements. Accordingly, it becomes highly complex in configuration, and requires slower control clocks. The latter requirement of course degrades performance characteristics.

Moreover, in order to effectively store the result into the general register 23, a buffer register 30 has to be provided between the shifter 20 and the general register 23. This further complicates the hardware configuration.

Accordingly, as mentioned above, as most of the input operands are normalized, it is irksome to have to utilize such a large shifter in the main execution path especially when it is apt to be only infrequently used.

SUMMARY OF THE INVENTION

It is an object of this invention to provide a hardware arrangement for floating-point multiplication by which fast execution can be attained with a simple hardware configuration.

Another object of this invention is to provide a method by which high speed floating-point multiplication can be attained with only simple additional hardware.

In brief, the amount of shifting required for normalizing a result of the floating-point type multiplication is screened to determine if it falls within a predetermined range. The result is directly normalized in the event that the amount of shifting falls within the range while if the amount falls outside the predetermined range, the result is subject to coarse shifting until it falls in the predetemined range and then is normalized.

One aspect of this invention takes the form of a hardware arrangement for executing floating-point multiplication under control of a microprogram, comprising: first means to which a multiplier and a multiplicand are applied, the first means determining whether or not the amount of shifting for normalizing a result of the multiplication falls within a predetermined range; second means receiving the multiplier and the multiplicand, and executing the multiplication and generating the result thereof; and third means coupled to the second means, the third means normalizing the result in the event that the first means determines that the amount of shifting falls within the predetermined range, and the third means normalizing the result after shifting the result into the predetermined range in the event that the first means determines that the amount of shifting falls outside the predetermined range.

Another aspect of the present invention takes the form of a hardware arrangement for executing floating-point multiplication under control of a microprogram, comprising: first means to which a multiplier and a multiplicand are applied, the first means determining whether or not the amount of shifting for normalizing a result of the multiplication falls within a predetermined range; second means receiving the multiplier and the multiplicand, executing the multiplication and generating the result thereof; third means coupled to the second means, the third means normalizing the result in the event that the first means determines that the amount of shifting falls within the predetermined range; and fourth means coupled to the second and third means, the fourth means receiving the result in the event that the first means determines that the amount of shifting falls outside the predetermined range, the fourth means shifting the result into the predetermined range and applying the output thereof to the third means which normalizes the output of the fourth means.

Still another aspect of the present invention takes a form of a method of executing floating-point multiplication under control of a microprogram, comprising the steps of: receiving a multiplier and a multiplicand, and determining whether or not the amount of shifting for normalizing a result of the multiplication falls within a predetermined range; receiving the multiplier the multiplicand, and executing the multiplication and generating the result thereof; and normalizing the result in the event that the amount of shifting falls within the predetermined range, and normalizing the result after shifting the result into the predetermined range in the event that the amount of shifting falls outside the predetermined range.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 2 is a block diagram showing the prior art floating-point circuit arrangement which was discussed in the opening paragraphs of the instant specification;

FIG. 3 is a block diagram showing an arrangement according to an embodiment of the present invention; and FIGS. 4 and 5 are timing charts which demonstrate the operation of the embodiment shown in FIG. 3.

DETAILED DESCRIPTION OF THE PREFERRED EMBODIMENTS

Figure 1A:
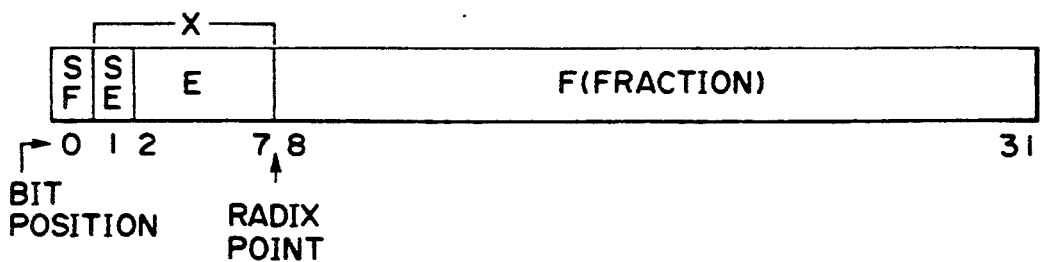
FIG. 1A is a diagram showing a floating-point data format which was referred to in the opening paragraphs of the instant specification.

An embodiment of this invention will be discussed with reference to FIGS. 3 through 5.

The arrangement of FIG. 3 differs from that of FIG. 2 in that the former arrangement lacks register 30 and is further provided with blocks 9, 16, 18, 21, 22, 24, 40 and 42. The blocks as already referred to in connection with FIG. 2 will not be referred to in detail to simplify the description.

According to the present invention, the microprogram derived from the memory 3 checks to see if the amount of shifting for normalization falls outside a predetermined range at a first detector 9. If this happens, the microprogram is induced to pause for one clock during which time a large coarse adjustment for shifting of the result is hardware implemented at a second shifter 22. Thereafter, microprogram control is again resumed to complete normalization at a first shifter 40.

Figure 1B:
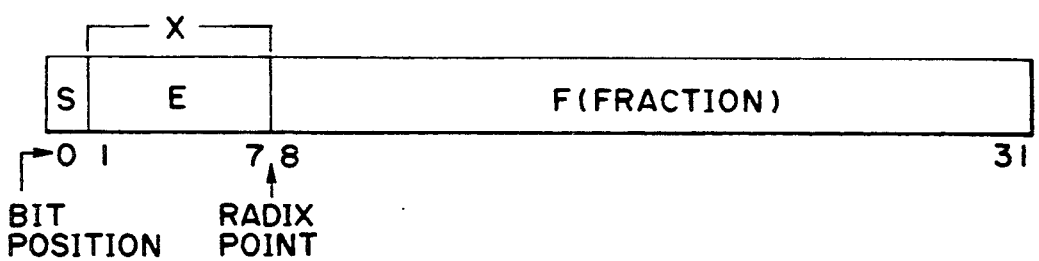
FIG. 1B is a diagram showing another floating-point data format which was referred to in the opening paragraphs of the instant specification.

It is assumed that each of the input operands stored in the registers 6 and 8 has the data format shown in FIG. 1B. It follows that if two input operands are normalized, one digit shifting to the left is sufficient for normalization and there is no need of normalization in the case that a carry occurs during multiplication.

The first detector 9 is supplied with the input operands from the registers 6 and 8, and determines whether or not the amount of shifting for normalization exceeds one digit. If such an amount of shifting is found to be one or zero, then a flag 24 is set to "0". Otherwise, the flag 24 assumes "1".

In response to the flag 24 being set to "0", the selector 16 applies the output of the adder 15 to the second detector 42 and the first shifter 40. The second detector 42 detects the amount of shifting to the left (viz., one or zero) and stores the same in the register 18. Following this, the first shifter 40 normalizes the output of the adder 15 according to the value stored in the register 18, or implements no shifting if the output is already normalized by a carry. It should be noted that the first shifter 40 corresponds to the shifter 20 in FIG. 2 but is configured to merely perform a single left shifting. As a consequence, the first shifter 40 is markedly simple in configuration as compared with the prior art shifter 20. On the other hand, in the case where the flag 24 is set to a logic "1", the executions of the first to third stages under the microprogram is inhibited during the next one clock. During this clock, the third detector 21 detects the amount of shifting to the left, after which the second shifter 22 implements shifting 2n digits to the left (wherein n is a positive integer) and the result thereof is applied to the selector 16. Since the 2n-digit shifting is rapidly carried out by the hardware, the time required for the same is extremely short. This means that there is no need to slow down the clocks as in the case of the prior art technique. After the clock during which the 2n-digit shifting is carried out, the control under the microprogram restarts. Therefore, the selector 16 relays the output of the second shifter 22 to the second detector 42 and also to the first shifter 40 via the register 19. The execution at the blocks 42, 18 and 40 has already been described.

Figure 4:
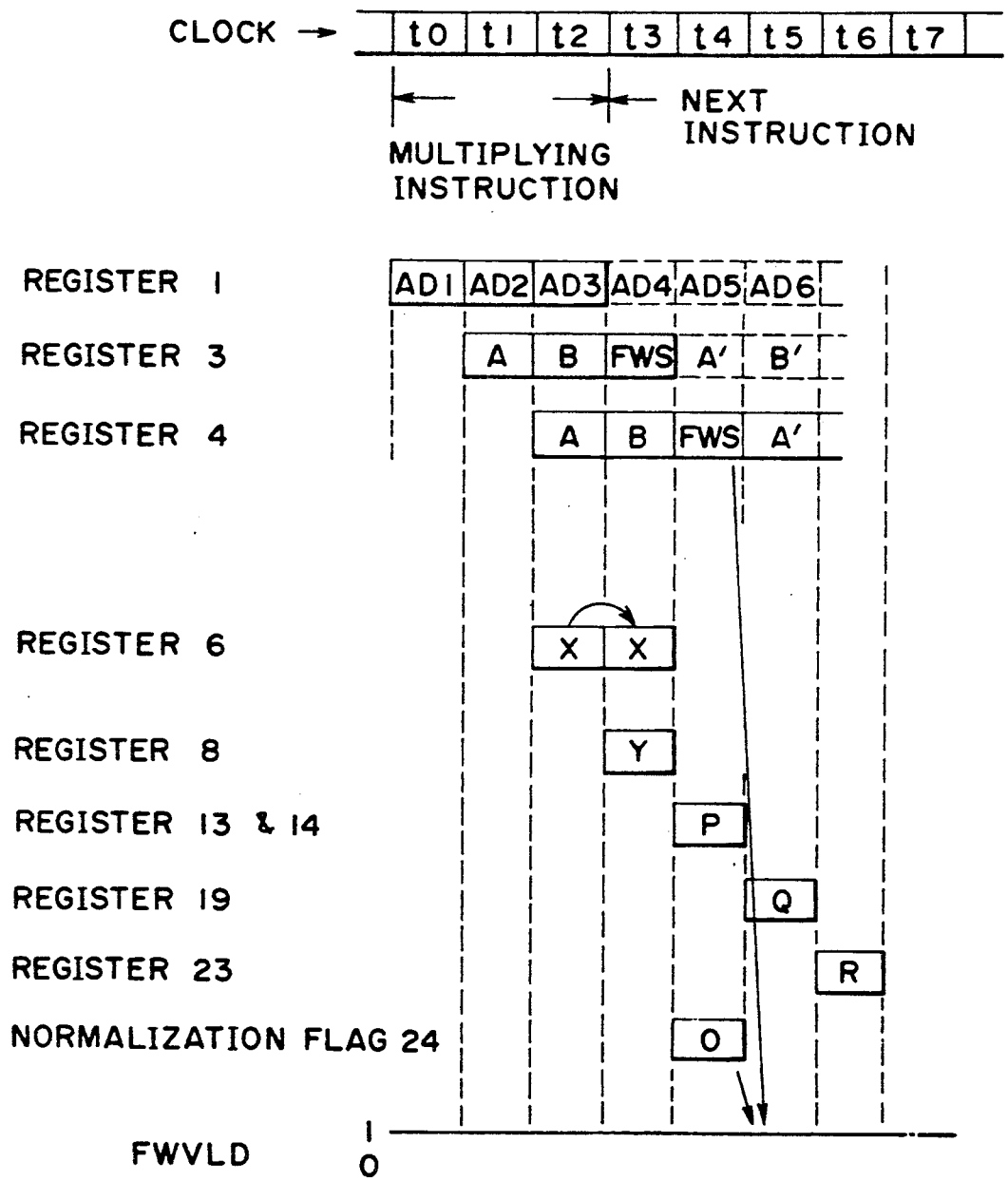

FIG. 4 is a timing chart for describing in more detail the case where the output of the adder 15 requires no shifting or a single digit shifting, while FIG. 5 is a timing chart for describing the other case (viz., the amount of shifting exceeds two digits).

In FIGS. 4 and 5, the execution under the control of the microprogram is allowed while a signal FWVLD (Firmware Valid) assumes a logic "1", and it is inhibited while the signal FWVLD assumes a logic "0". The signal FWVLD assumes a logic "0" only when a special instruction FWS is executed and while the flag 24 assumes a logic "1".

In FIG. 4, the address register 1 generates instruction addresses AD1, AD2, AD3, ..., AD6, wherein the first three addresses belong to the first instruction and the subsequent ones to the next instruction. The memory 2 sequentially outputs, in response to the above-mentioned addresses AD1, AD2 and AD3, microinstructions A, B and FWS. These instructions are stored in the register 3 within clocks t1, t2, and t3 and then in the following register 4 within clocks t2, t3 and t4. The register 6 is supplied with the multiplicand during clock t2, while the register 8 stores the multiplier during clock t3. These input operands, stored within the registers 6 and 8, undergo multiplication, and partial results (denoted P) are stored in the registers 13, 14 during clock t4. Since the flag 24 assumes a logic "0" in this case, the signal FWVLD remains to hold a logic "1". This means that the second shifter 22 does not operate.

On the other hand, in FIG. 5, the flag 24 assumes a logic "1" and simultaneously the instruction FWS is executed during clock t4, and hence the microprogram is inhibited during clock t5. Therefore, the second shifter 22 implements the aforesaid 2n-digit shifting by hardware. The microprogram restarts the next clock t6 during which the first shifter 40 performs one-digit shifting (for example) with the output of the second shifter 22. Thereafter, the shifter 40 stores the result in the register 23 during clock t6.

While the foregoing description describes only one embodiment of the present invention, various alternatives and modifications are possible without departing from the scope of the present invention, which is limited only by the appended claims, as will be apparent to those skilled in the art.

What is claimed is:

1. A hardware arrangement for executing floating-point multiplication under control of a microprogram, comprising:

first means to which a multiplier and a multiplicand are applied, said first means determining whether or not an amount of shifting for normalizing a result of multiplication falls within a predetermined range;

second means for receiving said multiplier and said multiplicand, executing multiplication and generating a result thereof;

third means coupled to said second means, said third means normalizing said result in the event that said first means determines that said amount of shifting falls within said predetermined range; and fourth means coupled to said second and third means, said fourth means receiving said result in the event that said first means determines that said amount of shifting falls outside said predetermined range, said fourth means shifting said result into said predetermined range and applying an output thereof to said third means which normalizes said output of said fourth means.

2. A hardware arrangement as claimed in claim 1, wherein said first, second and third means are inhibited from operation for a predetermined time duration in the event said first means determines that said amount of shifting falls outside said predetermined range, allowing said fourth means to undergo shifting by means of hardware during said predetermined time duration, said first, second and third means restarting when said predetermined time duration expires.

3. A hardware arrangement as claimed in claim 1, wherein said third means comprises:

detecting means coupled to said second means, said detecting means specifying said amount of shifting for normalizing said result; and shifting means coupled to said detecting means and said second and fourth means, said shifting means selectively normalizing an output of either of said second or fourth means in accordance with said amount of shifting specified by said detecting means.

4. A hardware arrangement as claimed in claim 1, wherein said fourth means comprises:

detecting means coupled to receive said result from said second means, said detecting means specifying said amount of shifting for adjusting said result into said predetermined range; and shifting means coupled to said detecting means and said second and third means, said shifting means shifting said result into said predetermined range and applying an output thereof to said third means.

* * * * *